W. CONNER.
Sap Spile.
No. 76,402.
Patented April 7, 1868.
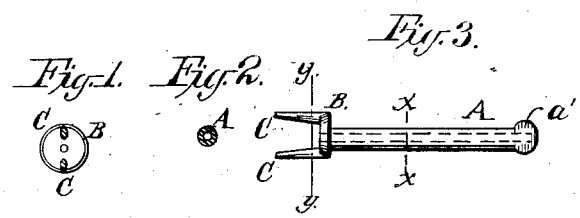
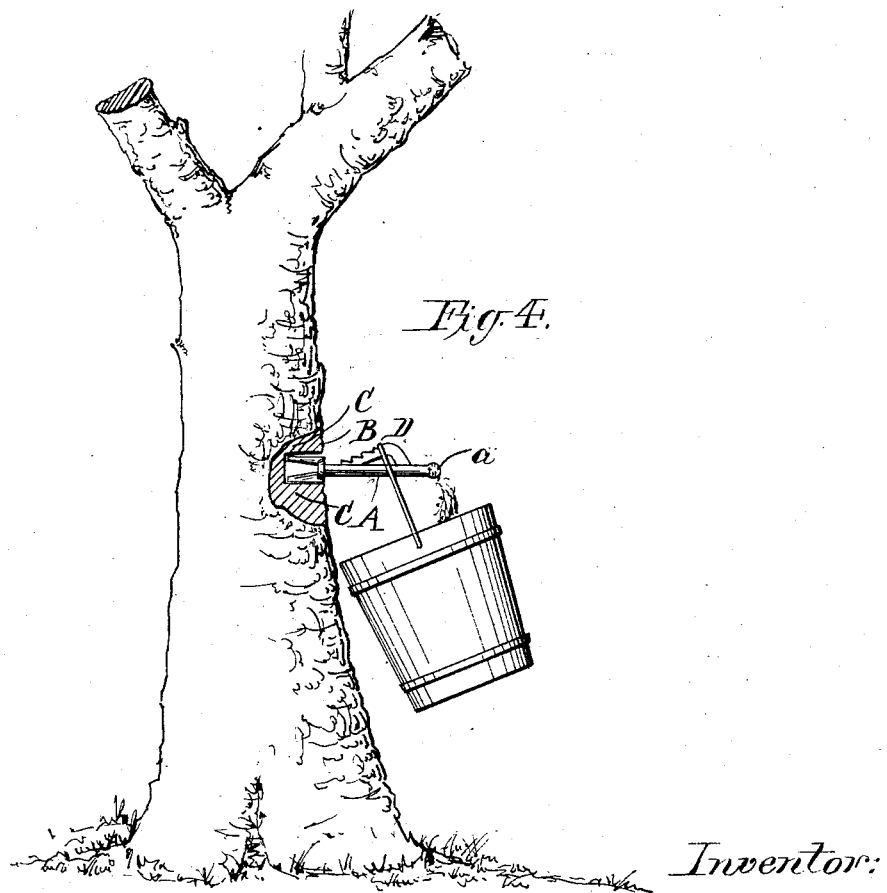

United States Patent Office.

WILLISTON CONNER, OF RENSSELAERVILLE, NEW YORK.

Letters Patent No. 76,402, dated April 7, 1868.

IMPROVEMENT IN SAP-SPILE.

The Schedule referred to in these Letters Patent and making part of the same.

TO ALL WHOM IT MAY CONCERN:

Be it known that I, WILLISTON CONNER, of Rensselaerville, in the county of Albany, and State of New York, have invented a new and improved Sap-Spile; and I do hereby declare that the following is a full, clear, and exact description thereof, which will enable others skilled in the art to make and use the same, reference being had to the accompanying drawings, forming part of this specification.

Figure 1 is a side view of my improved spile.

Figure 2 is a cross-section of the same, taken through the line $x\ x$, fig. 1.

Figure 3 is a cross-section of the same, taken through the line $y\ y$, fig. 1.

Figure 4 is a side view of a modified form of the same, showing in red lines the manner of its application to the tree.

Similar letters of reference indicate corresponding parts.

My invention has for its object to furnish an improved sap-spile, simple in construction, effective in operation, and which can be manufactured and sold for a very small amount; and it consists in a spile cast with a circular flange upon its inner end, the edge of which is bevelled, and from the inner side of which project two prongs; and in the combination with said spile of an inclined notched arm or longitudinal flange; the whole being constructed and arranged as hereinafter more fully described.

A is the body or stem of the spile, which is made hollow, or with a channel leading longitudinally through its central part, and the outer end of which may have a head or bulb, $a$, formed upon it to prevent it from being battered in driving it into the hole in the tree. Upon the inner end of the body or stem A is formed a circular flange, B, of such a size as to fit into the mouth of the auger-hole bored in the tree for its reception. The edge of the flange or shoulder B is bevelled off, as shown in figs. 1, 3, and 4, so that it may fit closely into the hole in the tree and prevent the escape of the sap around the edge of said flange B. Upon the inner side of the flange B are cast two prongs, C, which enter the hole in the tree, and rest against the upper and lower sides of said hole, so as to support the spile in position even when supporting a pail or other vessel to receive the sap. If desired, an inclined notched arm or flange, D, may be cast upon the upper side of the stem or body A of the spile, as shown in fig. 4, so that the pail or other vessel may be supported at a greater or less height, as the circumstances of the case may render advisable.

I claim as new, and desire to secure by Letters Patent—

1. An improved sap-spile, cast hollow, and with a circular flange, B, cast upon its inner end, said flange having its edge bevelled, and having two prongs, C, cast upon its inner side, substantially as herein shown and described, and for the purposes set forth.

2. The combination of the inclined and notched arm or flange D with the body or stem A of the spile, substantially as herein shown and described, and for the purpose set forth.

WILLISTON CONNER.

Witnesses:
ROBERT WASHBON,
CHESTER COOK.